Sept. 22, 1970    W. E. KASPARECK    3,529,480
PRECISION STEPPING DRIVE

Filed Nov. 7, 1968    2 Sheets-Sheet 1

INVENTOR
WALTER E. KASPARECK

BY
Wayland H. Riggins
ATTORNEYS

United States Patent Office 3,529,480
Patented Sept. 22, 1970

3,529,480
PRECISION STEPPING DRIVE
Walter E. Kaspareck, Huntsville, Ala., assignor to the United States of America as represented by the Administrator of the National Aeronautics and Space Administration
Filed Nov. 7, 1968, Ser. No. 774,151
Int. Cl. F16h 25/06
U.S. Cl. 74—63                                    3 Claims

ABSTRACT OF THE DISCLOSURE

A device for driving rotationally and in precise increments a ring gear having internal teeth. A cam disk having a continuous cam groove in the surface thereof is located centrally of the driven gear and two plungers extend from the cam groove toward the internal teeth of the ring gear. A cam following roller is joined to each of the plungers and as the cam disk rotates the plungers are caused to reciprocate alternately into and out of wedging engagement with the ring gear teeth by action of the cam groove against the rollers. Each reciprocating cycle of each plunger rotates the ring gear a precise amount.

ORIGIN OF INVENTION

The invention described herein was made by an employee of the United States Government and may be manufactured and used by or for the Government for governmental purposes without the payment of any royalties thereon or therefor.

BACKGROUND OF THE INVENTION

This invention relates generally to drive mechanisms and more particularly to a drive mechanism for rotating a ring gear in precise increments.

Stepping or incremental rotary drive mechanisms are known in the prior art and are utilized in a variety of applications. One of the most common types of incremental drive mechanisms is the ratchet drive wherein the external teeth on a ratchet wheel are engaged by a reciprocating ratchet to rotate the ratchet wheel a predetermined amount. The ratchet is typically actuated by a spring, and the ratchet wheel is prevented from free wheeling or backward motion by a pawl that engages the teeth of the ratchet wheel.

While existing drive mechanisms are suitable for many applications, there is a need in certain specialized activities for an incremental rotary drive mechanism that is capable of exerting a larger torque and of effecting rotation in more precise increments than is afforded by existing drive devices. One specialized need for an incremental rotary drive mechanism with relatively high torque capability has arisen in the aerospace field involving the incremental angular positioning of scale models of spacecraft about an axis for the purpose of measuring antenna receiving and transmitting characteristics.

SUMMARY OF THE INVENTION

The invention comprises a driven element which may take the form of a ring gear having internal teeth. A rotating cam disk is disposed centrally of the ring gear and a pair of plungers operatively connected to the cam disk extend from the cam disk toward the ring gear, being disposed in guides in a base plate. The plungers reciprocate alternately toward and away from the teeth of the ring gear, being actuated by the cam disk as it rotates. The ends of the respective plungers remote from the cam disk are wedge shaped, and these wedge shaped ends of the two plungers alternately engage and withdraw from the teeth of the ring gear forcing rotation of the ring gear in precise increments.

Accordingly it is a general object of the present invention to provide an improved incremental drive mechanism.

A more specific object of the invention is to provide an incremental rotary drive mechanism having a relatively high torque capacity, improved durability and increment precision.

Another object of the invention is to provide an incremental rotary drive mechanism capable of effecting precise incremental rotation of relatively heavy objects, such as scale models of spacecraft.

These and other objects and advantages of the invention will become apparent upon reference to the following specification, attendant claims and drawing.

DESCRIPTION OF THE PREFERRED EMBODIMENT

Figure 1:
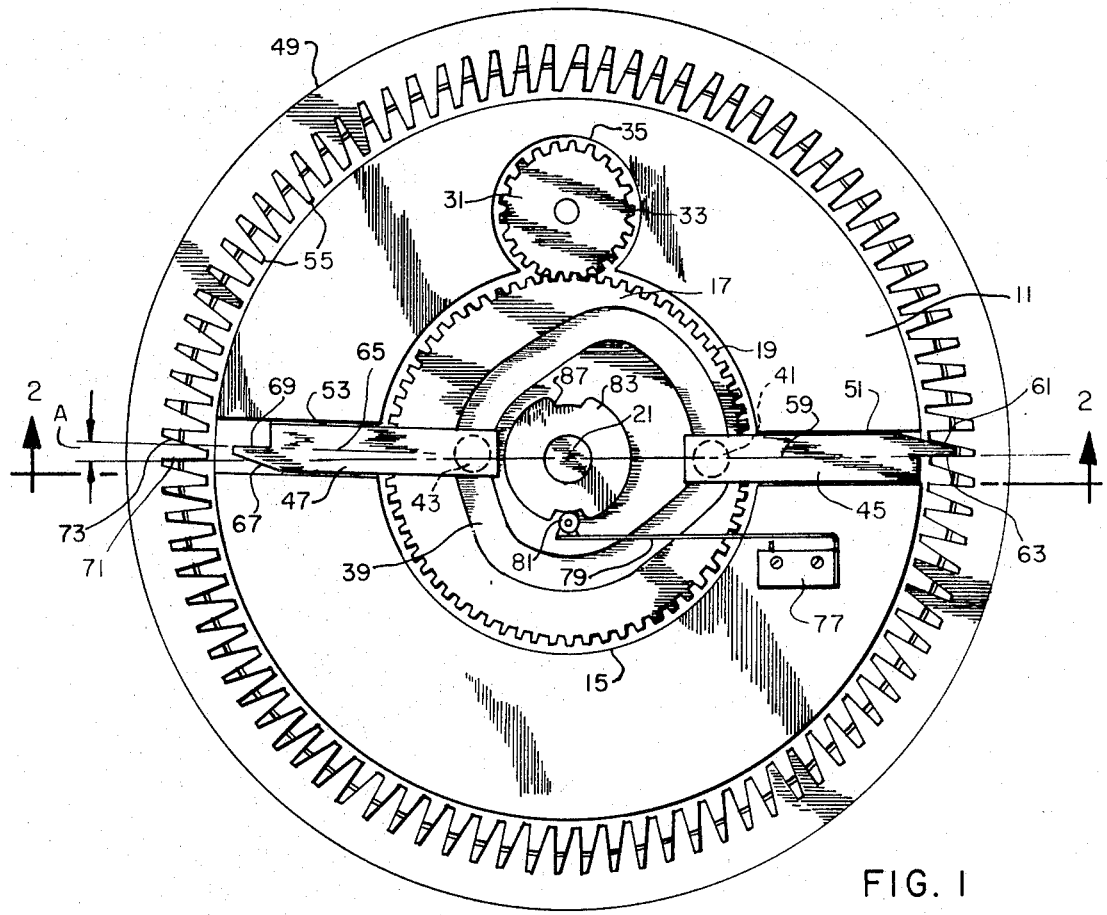
FIG. 1 is a plan view (cover plate removed) of the incremental rotary drive of the present invention.
Figure 2:
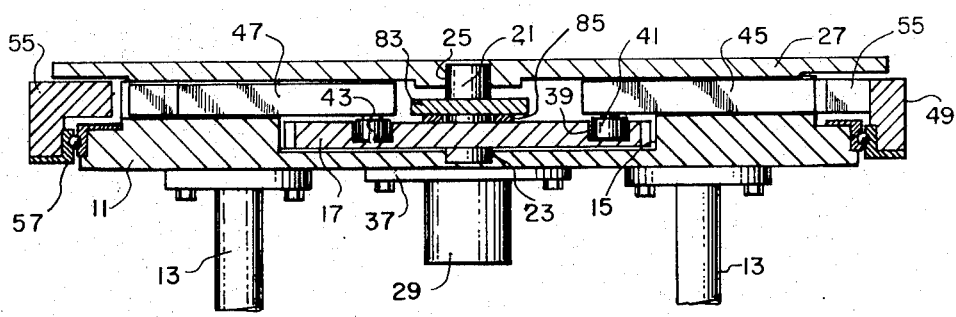
FIG. 2 is a cross sectional view taken along line 2—2 of FIG. 1.

Referring to FIGS. 1 and 2, the drive mechanism shown therein comprises a circular base plate 11 supported on a plurality of frame members 13 which members would be incorporated in the structure of the particular system in which the drive mechanism is operated. A circular recess 15 is formed in the base plate 11 with the vertical center line of the recess coinciding with the vertical center line of the base plate. Fitted in the recess 15 is a circular cam disk 17 having external teeth 19. The cam disk 17 is journalled on a center shaft 21 that is fixed at one end in an opening 23 in center of the base plate 11 and the other end in an opening 25 in the center of a circular cover plate 27 (FIG. 2).

The cam disk 17 is designed to rotate around the shaft 21, being driven by a motor 29 through a driving gear 31 having teeth 33 that engage the teeth 19 of the cam disk 17. The driving gear 31 rotates in an opening 35 in the base plate 11, and the motor 29 is anchored to the bottom of the base plate 11 with bolts extending through an annular flange 37.

A continuous cam groove 39 is formed in the cam disk 17 and is of a special configuration which will be discussed hereinafter. The cam groove receives two rollers 41 and 43 which rollers are attached, respectively, to a first plunger 45 and a second plunger 47. The plungers 45 and 47 extend outwardly from their respective rollers toward a ring gear 49, the plunger 45 being in a guide slot 51 in the base plate 11, the plunger 47 being in a guide slot 53 in the base plate. The ring gear 49 has successive internal teeth 55 and this gear is driven so as to rotate around the base plate 11. Bearings 57 (FIG. 2) are installed between the ring gear and the base plate.

The plunger 45 is directed on a radial line 59 and has an end wedge portion including a wedging surface 61 and a locking surface 63, the later surface coinciding with the radial line 59. The plunger 47 is directed on a radial line 65 and has an end wedge portion of the same configuration as that on the plunger 45, including a wedging surface 67 and a locking surface 69. The locking surface 69 coincides with the radial line 65. As illustrated in FIG. 1, the radial line 59 is horizontal and the radial line 65 deviates in a clockwise direction from the horizontal by the radial distance A, which distance is one half the circular pitch of the teeth 55. Thus the plungers 45 and 47 are positioned on radial lines that form an angle of 180 degrees minus one half the circular pitch of the gear teeth. In the embodiment illustrated in FIG. 1, the ring gear 49 has 90 teeth with the circular pitch being 4 degrees. Each tooth 55 has a locking surface 71 coinciding with a radial line of the ring gear 49 and a wedging surface 73.

As will now be explained with reference to FIGS. 3 through 6, clockwise rotation of the cam disk 17 causes alternate reciprocation of the plungers 45 and 47. The end wedge portions of those plungers alternately engage the teeth 55 of the ring gear 49 forcing the ring gear to rotate counterclockwise in precise steps.

Figure 3:
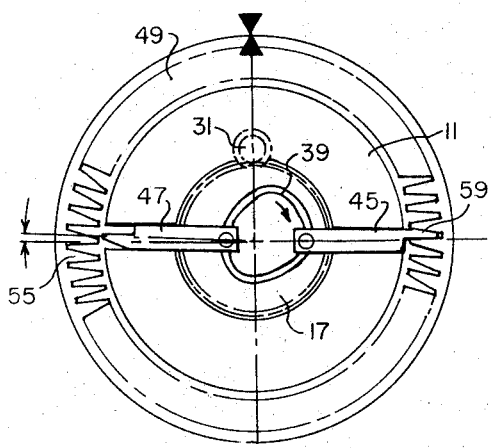
FIGS. 3 through 6 are schematic views showing in sequence the operational movement of the drive mechanism.
Figure 4:
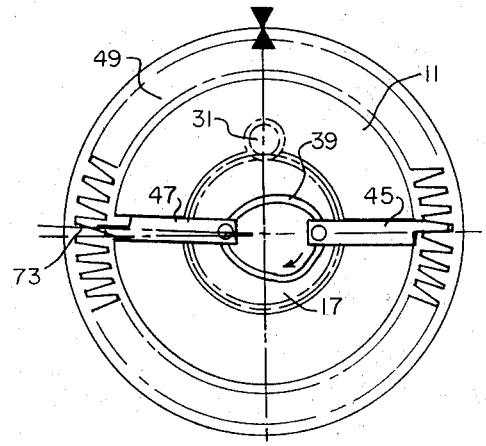

As shown in FIG. 3 the wedge portion of the plunger 45 is in full engagement between two of the teeth 55 of the ring gear 49 and the opposite plunger 47 is entirely disengaged from the teeth 55. This is the extended position of the plunger 45 and the retracted position of the plunger 47. FIG. 4 shows the position of the plungers 45 and 47 after the cam disk has been rotated 60 degrees clockwise by the motor 29. The plunger 47 has been pushed into initial engagement with the wedging face 73 of one of the teeth 55. This movement of the plunger 47 is caused by the section of the cam groove 39 rotating by the roller 43 while gradually increasing in radial distance from the center of the cam disk from a minimum distance to an intermediate distance. The radial position of the cam groove acting on the roller 41 was constant over this 60 degree clockwise movement, causing no shifting of the plunger 45. Therefore, after the cam disk 17 has rotated 60 degrees clockwise from the starting position of FIG. 3 the plunger 45 remains in full engagement between two of the gear teeth 55 and the plunger 47 has moved half way toward full extension to the left.

Upon rotation of another 60 degrees clockwise by the cam disk 17 (see FIG. 5) the plunger 45 is entirely disengaged from the teeth 55. This movement of the plunger 45 is caused by the radial distance of the cam groove 39 from the center of the cam disk gradually decreasing from maximum to minimum as this portion of the cam groove rotated by the roller 41 attached to the plunger 45. During this rotation of the cam disk 17 the portion of the cam groove that rotated by the roller 43 attached to the plunger 47 did not change in radial distance from the center of the cam disk and the plunger 47 did not move. The plunger 47 prevents the ring gear 49 from free wheeling after the plunger 45 is completely disengaged therefrom.

Figure 5:
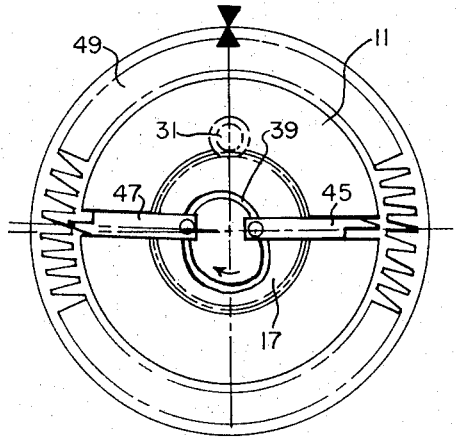
Figure 6:
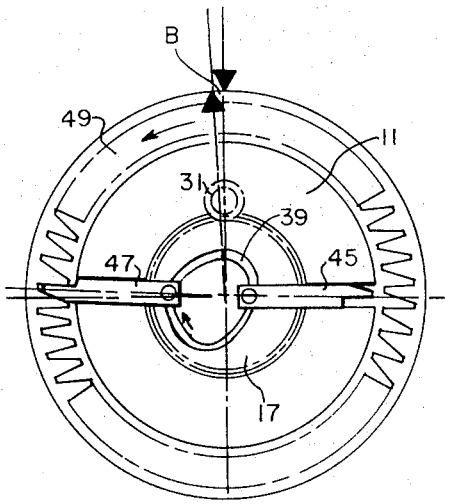

FIG. 6 shows the position of the plungers 45 and 47 after the cam disk 17 has turned another 60 degrees clockwise from the position of FIG 5 and 180 degrees clockwise from the position shown in FIG. 3. During the 60 degree rotation between that shown in FIG. 5 and FIG. 6, the portion of the cam groove 39 rotating by the roller 43 increased in radial distance from the center of the cam disk 17 from an intermediate distance to the maximum distance thus causing the plunger 47 to extend fully to the left and to wedge the ring gear 49 counterclockwise by one half the circular pitch between the gear teeth 55. The portion of the cam groove passing by the roller 41 did not change in its distance from the center of the cam disk 17 and thus the plunger 45 did not move during the last 60 degree rotation.

In the position shown in FIG. 6 the plungers 45 and 47 have taken opposite positions from that shown in FIG. 3 and have caused the ring gear 49 to move counterclockwise by a distance B which is one half of the circular pitch between the gear teeth 55. If the cam disk 17 is rotated another 180 degrees clockwise the plungers 45 and 47 will again reverse positions and return to the position shown in FIG. 3 at the same time forcing the ring gear 49 to rotate counterclockwise by the distance B.

In order to cause the motor 29 (FIGS. 1 and 2) to turn the cam disk 17 in 180 degree increments a limit switch 77 connected to the motor 29 is mounted on the base plate 11. This switch is actuated by a spring arm 79 having a roller 81 on the end thereof that follows a switch cam 83 mounted on the cam disk 17. The switch cam 83 is joined to the cam disk through an annular spacer 85 (FIG. 2) and rotates on the shaft 21. The switch cam has grooves 87 diametrically opposed on the periphery of the switch cam such that when the roller 81 rides into the grooves 87 the switch 77 opens thus stopping the motor 29.

Preferably the wedge angle on the wedge face 73 of the gear teeth 55 is small to insure self-locking of the ring gear. In the embodiment disclosed the wedge face 73 forms an angle of 24 degrees with the locking surface 71 thereof, and the angle of the wedging surfaces 61 and 67 of the respective wedge portions of the plungers 45 and 47 is 22 degrees with the respective locking surfaces 63 and 69.

I claim:
1. A precision stepping drive comprising:
 (a) a supporting structure including a base plate having two guide slots therein;
 (b) driven means comprising a ring gear adapted to rotate around said base plate and having a plurality of successive internal gear teeth;
 (c) each of said gear teeth having a wedging face;
 (d) a rotatable cam disk mounted centrally of said ring gear and mounted on said base plate;
 (e) said cam disk having a cam surface comprising a continuous groove in said disk;
 (f) first and second reciprocating plungers positioned, respectively, in said guide slots of said base plate;
 (g) said plungers and said guide slots being positioned on radial lines of said ring gear;
 (h) each of said plungers having a wedging surface;
 (i) a cam follower connected to each of said plungers and being disposed in said continuous groove;
 (j) said first plunger being in an extended position with said wedging surface extending between and engaging opposed surfaces of two of said gear teeth of said ring gear;
 (k) said second plunger being in a retracted position with said wedging surface being aligned with the wedging face of one of said gear teeth whereby extension of said second driving element will cause wedging contact between said wedging surface and said wedging face;
 (l) power means for rotating said cam disk.

2. The invention as defined in claim 1 wherein said continuous groove in said cam disk is oriented around the center of said disk, said groove comprising sections of changing radial distance from the center of said disk alternating with sections of uniform radial distance from the center of said disk, each of said sections comprising substantially 60°.

3. The invention as defined in claim 1 wherein said base plate has a recess in the central region thereof, said cam disk disposed in said recess, means for automatically stopping rotation of said cam disk after a rotation of 180°.

References Cited
UNITED STATES PATENTS

| | | | |
|---|---|---|---|
| 1,543,791 | 6/1925 | Pitter | 74—63 |
| 1,748,443 | 2/1930 | Dawson | 74—55 |
| 2,820,369 | 1/1958 | Ingalls | 74—63 |
| 3,258,994 | 7/1966 | Gorfin | 74—804 |

WESLEY S. RATLIFF, Jr., Primary Examiner

U.S. Cl. X.R.

74—55, 804